Patented Jan. 12, 1943

2,308,115

UNITED STATES PATENT OFFICE 2,308,115

CERAMIC BODY AND METHOD OF MAKING SAME

Karl Schwartzwalder and Albra H. Fessler, Flint, Mich., assignors to General Motors Corporation, Detroit, Mich., a corporation of Delaware No Drawing. Application April 23, 1940, Serial No. 331,211

6 Claims. (Cl. 106—57)

This is a continuation in part of our prior application Serial No. 191,400, filed February 19, 1938, now Patent No. 2,272,338, granted February 10, 1942, which was in turn a continuation in part of our prior application Serial No. 48,902, filed November 8, 1935.

This invention has to do with ceramic bodies particularly useful as electrical insulators for spark plugs of internal combustion engines and methods of making the same.

In our copending application Serial No. 191,400 there is disclosed and claimed an insulator body formed by sintering a mixture consisting principally of zircon, or its equivalent oxides, zirconia and silica, together with alumina. Preferred insulator compositions there disclosed contain from about 1 to 15% zircon. While good insulator bodies may be produced from compositions containing greater amounts of zircon, greater difficulty is experienced in firing them.

We have found it possible to substantially improve alumina-zircon or alumina-zirconia-silica insulators by adding thereto a proportion of magnesia, preferably in the form of talc. Insulators as disclosed in this application, made from alumina, zirconia, silica and magnesia are characterized by increased mechanical strength, increased thermal conductivity and increased dielectric strength especially at high temperatures.

The raw material used in making the improved bodies and the methods of manufacture which have been successfully employed will now be described.

Alumina

Alumina is preferably used in the form of calcined alumina prepared by the Bauer process; or as calcined diaspore or bauxite; or as electric furnace or high temperature calcined alumina; or in combined form such as clay, aluminum silicates of the sillimanite group, or as magnesium aluminate, or magnesium aluminum silicate and the like.

Zirconia

Zirconia is preferably added as chemically precipitated low temperature calcined zirconia; as high temperature calcined or fused zirconia; or in combined form such as zircon; or magnesium zirconium silicate.

Magnesia

Magnesia may be added in oxide form or as magnesium carbonate; as talc (magnesium silicate), either raw or calcined, or as synthetically prepared Forsterite ($2MgoSiO_2$); or in the combined forms previously mentioned. Magnesia may be replaced in part by another alkaline earth oxide such as beryllium, calcium, barium or strontium oxide.

Silica

Silica may be added as crystalline or amorphous silica; or in the combined forms previously mentioned.

If desired the materials may be added in various mineralogical forms other than those specified which are capable of conversion into the same end product by firing, and all such modifications are contemplated within the scope of this invention.

Best results have been obtained with mixes having compositions within approximately the following ranges:

|  | Per cent |
|---|---|
| Alumina | 65 to 98 |
| Zirconia | .6 to 21 |
| Silica | .5 to 31 |
| Magnesia | .3 to 11 |

We prefer, in practice, to introduce these materials in the form of alumina, zircon and talc, the two last-named materials costing considerably less than the corresponding oxides and also facilitating firing. The following is the approximate equivalent range in terms of these materials:

|  | Per cent |
|---|---|
| Alumina | 65 to 98 |
| Zircon | 1 to 30 |
| Talc | 1 to 33 |

One of the best bodies we have so far developed embodying the present invention consists of:

|  | Per cent |
|---|---|
| Alumina | 95 |
| Zircon | 3½ |
| Talc | 1½ |

This body was ground in a steel mill resulting in the addition of iron equivalent to approximately 1% iron oxide which gives a brown color to the fired body and effects some slight improvement in physical properties.

The following table shows the various properties of this body compared with a body consisting of 100% sintered alumina and with a typical present day commercial porcelain insulator:

|  | Typical porcelain insulator | 100% alumina insulator | 95% alumina 3.5% zircon 1.5% talc insulator |
|---|---|---|---|
| Transverse strength lbs. per sq. in. | 17,500 | 24,660 | 48,470 |
| Same; after quenching lbs. per sq. in. | 3,400 | 11,610 | 15,340 |
| Compressing strength lbs. per sq. in. | 64,000 | 182,600 | 191,370 |
| Thermal expansion 200-600 C. | $4.5 \times 10^{-6}$ | $8.23 \times 10^{-6}$ | $8.08 \times 10^{-6}$ |
| Thermal diffusivity | .0110 | .0303 | .033 |
| Thermal conductivity (calculated) | -------- | .0252 | .0264 |
| Dielectric strength | 5,868 | 5,860 | 11,076 |
| $T_0$ value (dielectric strength at high temperatures) | 557° C. | 650° C. | 631-647° C. |

The market superiority of the improved body in mechanical and dielectric strength is evident from the above comparison. In addition the firing temperature is but 1650-1730° C. compared with a firing temperature of from 1740-1760° C. in the case of an all-alumina body. The long firing range possessed by this body makes manufacture much easier because it reduces the necessity for extremely accurate control of firing conditions. Such control is very difficult to attain at high temperatures.

Another example of a superior body coming within the present invention consists of 75% alumina, 20% talc and 5% zircon. The firing temperature of this body was about 1530° C. The body possesses, among other qualities, a very high thermal conductivity compared with present day porcelains, permitting it to run on breakdown test in an engine operating under adverse conditions for a much longer period than conventional spark plugs.

We have made and successfully operated spark plugs having insulators of many different compositions falling within the above range of oxide compositions and have found them to possess the superior properties referred to. Among the compositions so tested are those listed below. These are tabulated according to oxide content rather than the mineralogical composition of the raw materials.

| Alumina | Silica | Zirconia | Magnesia |
|---|---|---|---|
| 98 | 0.5 | 1.0 | 0.5 |
| 97.2 | 1.25 | 1.0 | 0.6 |
| 97 | 0.5 | 1.0 | 1.5 |
| 95.3 | 1.24 | 2.5 | 0.9 |
| 95.3 | 1.7 | 2.0 | 1.0 |
| 95 | 0.9 | 2.3 | 0.5 |
| 90.5 | 2.5 | 5.0 | 1.9 |
| 90.5 | 4.2 | 3.3 | 1.9 |
| 81.4 | 7.63 | 5.1 | 5.9 |
| 81.0 | 8.5 | 6.7 | 3.8 |
| 81.0 | 5.1 | 10.1 | 3.9 |
| 76.9 | 11.9 | 3.4 | 7.8 |
| 76.8 | 10.3 | 5.1 | 7.8 |
| 72.2 | 14.5 | 3.4 | 9.9 |
| 71.8 | 13.6 | 6.8 | 7.8 |
| 71.7 | 10.3 | 10.3 | 7.8 |
| 70.9 | 11.9 | 13.4 | 3.9 |
| 70.9 | 5.1 | 20.2 | 3.9 |
| 67.4 | 17.2 | 3.4 | 11.9 |
| 95 | 0.9 | 2.3 | [1] 0.9 |

[1] Plus 0.25 to 1.0% of iron oxide, manganese dioxide, cobalt oxide, chromium oxide, or nickel oxide.

In the foregoing table the small amount of calcium oxide usually present as an impurity in talc is included with the magnesia content.

The oxides of iron, manganese, cobalt, chromium or nickel included in the last composition are used either singly or jointly to improve certain physical properties or to give a desired color to the product.

Articles produced from the compositions specified may be processed in the manner described in U. S. Patent No. 2,091,973, granted to A. H. Fessler and Ralston Russell on September 7, 1937; or in the manner described in U. S. Patent No. 2,122,960, granted to Karl Schwartzwalder on July 5, 1938; or by casting in molds; or by extrusion and grinding dried blanks; or by other methods known to the ceramic art. The usual organic plasticizers or inorganic gels or zeolites may be added to aid fabrication.

The raw materials employed in the raw batch compositions are preferably in a very fine state of subdivision, the greatest portion of which should be between 0 and 5 microns with most of the remainder finer than 43 microns.

In our preferred method of forming described and claimed in Patent No. 2,122,960, the inorganic materials are ground together with a suitable proportion of temporary organic binder such as a thermo-setting or thermo-plastic resin together with a lubricant. The grinding results in thorough mixing of the material. The finely ground material is then granulated and formed into the desired shape. The setting of the resin produces a firm shape, readily handled in mass production, facilitating the subsequent manufacturing operation.

The formed body is fired to a sufficiently high temperature to eliminate the organic binder and recrystallize the mass into a dense, non-porous structure. Firing temperatures from about 1530° to 1730° C. have proven to be adequate for bodies coming within the range of this invention. Firing is preferably done on a long firing schedule as we have found that this tends to lessen the tendency for the pressed shapes to warp.

It will be understood that various conventional additions such as suitable fluxes or diluents may be made to the compositions disclosed herein without departing from the scope of the present invention.

We claim:

1. Ceramic material especially adapted for use as an insulator for spark plugs and the like characterized by high dielectric strength at both low and elevated temperatures, high mechanical strength, good resistance to heat shock and good thermal conductivity, formed by compressing into the desired shape a finely pulverized mixture showing upon chemical analysis a content consisting of approximately 65 to 98% aluminum oxide, from .6 to 21% zirconium oxide, from .5 to 31% silicon dioxide and from .3 to 11% alkaline earth flux, and sintering the shape into a dense, non-porous article.

2. An insulator for spark plugs and the like characterized by high dielectric strength at both low and elevated temperatures, high mechanical strength, good resistance to heat shock and good thermal conductivity, formed by compressing into the desired shape a finely pulverized mixture showing upon chemical analysis a content of approximately from 65 to 98% aluminum oxide, from .6 to 21% zirconium oxide, from .5 to 31% silicon dioxide and from .3 to 11% magnesium oxide, and sintering the shape into a dense, non-porous article.

3. An insulator for spark plugs and the like characterized by high dielectric strength at both low and elevated temperatures, high mechanical strength, good resistance to heat shock and good thermal conductivity, formed by compressing into the desired shape a finely pulverized mixture of approximately from 65 to 98% alumina, from 1 to 30% zircon, and from 1 to 33% talc, or their equivalents, and sintering the shape into a dense, non-porous article.

4. An insulator for spark plugs and the like characterized by high dielectric strength at both low and elevated temperatures, high mechanical strength, good resistance to heat shock and good thermal conductivity, formed by compressing into the desired shape a finely pulverized mixture consisting of approximately 95% alumina, 3½% zircon and 1½% talc, or their equivalents, and sintering the shape into a dense, non-porous article.

5. The process of making ceramic bodies which consists in preparing a finely pulverized mixture showing upon chemical analysis a content of approximately from 65 to 98% aluminum oxide, from .6 to 21% zirconium oxide, from .5 to 31% silicon dioxide and from .3 to 11% magnesium oxide, or their equivalents, shaping the body therefrom and sintering the body into a dense, non-porous article.

6. An insulator for spark plugs and the like characterized by high dielectric strength at both low and elevated temperatures, high mechanical strength, good resistance to heat shock and good thermal conductivity, formed by compressing into the desired shape a finely pulverized mixture showing up chemical analysis a content of approximately from 65 to 98% aluminum oxide, from .6 to 21% zirconium oxide, from .5 to 31% silicon dioxide and from .3 to 11% alkaline earth oxides including a proportion of magnesium oxide, and sintering the shape into a dense, non-porous article.

KARL SCHWARTZWALDER.
ALBRA H. FESSLER.